United States Patent [19]
Schneider et al.
[11] 3,971,680
[45] July 27, 1976

[54] ELECTROCONDUCTIVE PAPER

[75] Inventors: Charles A. Schneider, Villa Hills, Ky.; William R. Cake, Bay Village, Ohio

[73] Assignee: The Sherwin-Williams Company, Cleveland, Ohio

[22] Filed: Oct. 9, 1973

[21] Appl. No.: 404,549

[52] U.S. Cl. .......................... 428/537; 260/567.6 P; 427/121; 427/395; 428/411

[51] Int. Cl.$^2$ ........................ B32B 9/06; B32B 21/06

[58] Field of Search ............................ 117/154, 201; 260/567.6 P, 212; 427/395, 121; 428/411, 537

[56] References Cited

UNITED STATES PATENTS

| | | | |
|---|---|---|---|
| 2,261,002 | 6/1941 | Ritter | 260/570 |
| 3,265,734 | 8/1966 | Kraimen et al. | 260/567.6 |
| 3,619,284 | 11/1971 | Ray | 117/201 |

*Primary Examiner*—Cameron K. Weiffenbach
*Attorney, Agent, or Firm*—James V. Tura; Richard G. Smith

[57] ABSTRACT

This invention is directed to electroconductive paper and to the processes for preparing same which comprises a substrate containing an effective amount of an electroconductive water soluble, quaternary ammonium polymer. The polymer is prepared by reacting substantially stoichiometric amounts of at least one aromatic ditertiary amine and one or more anion-containing organic compound. The polymer is applied to the substrate, e.g. paper by conventional methods to obtain a coated surface characterized as having a resistivity of less than about $10^{11}$ ohms per square centimeter at relative humidities ranging from about 10% to 90%.

19 Claims, No Drawings

ELECTROCONDUCTIVE PAPER

This invention relates to electroconductive paper and to a process for preparing said paper and more particularly to the treatment or preparation of paper capable of receiving a photoconductive coating for use in the production of electrostatic copy paper. More specifically, this invention relates to electrostatic copy machine processes and to the paper used in electrostatic reproduction processes. The electroconductive paper of this invention is characterized as having a resistivity of less than about $10^{11}$ ohms/sq. cm. at a relative humidity ranging from about 10% to 90% and comprises a paper substrate with a coating comprising an effective amount of a substantially water-soluble quaternary ammonium polymer. The polymer is obtained by reacting substantially stoichiometric amounts of at least one aromatic ditertiary amine, and at least one anion-containing organic compound, e.g. a dibenzylic dihalide.

SUMMARY

Generally, in the preparation of coatings for paper, it is a practice to prepare mixtures consisting essentially of pigments, water-dispersing agents or the like and to blend the mixtures with different adhesives to provide a composition useful to produce coated paper having a high degree of brightness, smoothness, gloss, good finish, etc. It has been difficult, however, in preparing paper with a surface particularly adapted for printing, i.e. electrostatic printing, to find a composition which is not only electroconductive at low relative humidities, but is also soluble or at least dispersible in aqueous mediums to permit application of the coating onto the paper by conventional methods. Although there are a number of polymers available for this purpose, many of them have one or more disadvantages of either being too expensive and, therefore, not economical or are objectionable because of a strong odor, e.g. amine odor, poor color or color instability, etc. Moreover, it is important to have a conductive coating which satisfies not only the physical needs, e.g. the visual and odor requirements, but also the electrical requirements by having a high conductivity and the capability of rapidly discharging the electrostatic charge when exposed to light.

More specifically, non-impact printing processes require an electric charge to be on the surface of the paper while it is in darkness and it must contain a photoresponsive or photoconductive coating, e.g. zinc oxide, which causes the electric charge to dissipate in areas where the light strikes leaving a pattern of charged areas to reproduce the image. The charged area attracts a particulate para magnetic image-forming material, e.g. treated carbon black or the like which is fused or otherwise treated to make a permanent image on the paper. Generally, paper adaptable for electrographic printing requires that it have a conductivity corresponding to a resistivity of less than about $10^{11}$ ohms/sq. cm. e.g. preferably about $10^6$ to $10^7$ ohms/sq. cm. at ordinary temperatures, pressures and relative humidities. The volume resistivity of paper may be determined, for example, by measuring the surface resistivity of a sheet of paper between electrodes spaced approximately 0.25 inches apart and extending about 0.5 inches onto the surface from one edge of the paper. Since the surface of the paper between the electrodes is relatively large compared to the volume of the paper between the electrodes and is substantially equal to the volume, the surface resistivity can be determined by meauring the volume resistivity of the paper. A procedure for determining surface resistivity is ASTMD-256-61.

Accordingly, it is an object of this invention to provide an electroconductive paper particularly useful in non-impact printing processes characterized by having improved brightness and a stability of conductivity over a range of relatively humidities. It is another object of this invention to provide an electroconductive paper and a process for preparing same which is useful in various photocopying machines. It is a further object of this invention to provide a method of preparing a paper substrate capable of receiving an electrostatic charge pattern that can be developed to produce a visible image. It is still another object of this invention to provide a water-soluble quaternary ammonium polymer that can be used as a coating on a paper substrate to provide an electroconductive surface adapted for electrostatic printing. It is still a further object of this invention to provide a sensitive electroconductive paper particularly useful in high speed photocopying machines. These and other objects of this invention will become apparent from a further and more detailed description as follows.

DESCRIPTION INCLUDING EMBODIMENTS

Specifically, this invention relates to electroconductive paper and to the method of preparing said electroconductive paper characterized as having a resistivity of less than about $10^{11}$ ohms per sq. cm. In order to have sufficient conductivity and to be able to use the polymers of this invention in an electroconductive layer in an image recording element, the surface resistivity should not exceed certain limits, which themselves are influenced by the relative humidity. For example, the surface resistivity at about 10% relative humidity should not be higher than $10^{11}$ ohms/sq. cm. whereas at about 90% relative humidity the surface resistivity should not be higher than $10^6$ ohms/sq. cm.

The electroconductive paper consists essentially of a paper substrate and an effective amount, e.g. from about 0.5 to 1.5 grams/sq. meter of paper of a substantially water-soluble electroconductive quaternary ammonium polymer obtained by reacting approximately 0.8 to 1.3 moles and preferably, approximately stoichiometric amounts of a. at least one aromatic diamine having the formula:

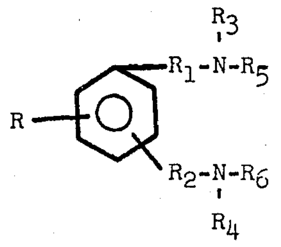

wherein R is hydrogen or an alkyl or substituted alkyl radical of 1 to 4 carbon atoms, $R_1$ and $R_2$ are either the same or different divalent alkyl or substituted-alkyl radicals of 1 to 4 carbon atoms in either the ortho, meta or para position, and $R_3$, $R_4$, $R_5$ and $R_6$ are either the same or different radicals selected from the class consisting of an alkyl, e.g. methyl or substituted-alkyl, e.g. beta-hydroxy ethyl radical of 1 to 4 carbon atoms, and b. about 1.0 mole of at least one anion-containing organic compound having the formula:

$X-Y_1-R_7-Y_2-X$ wherein $R_7$ is a divalent organic radical having 2 to 16 carbon atoms selected from the class consisting of alkyl radicals, cycloalkyl radicals, aryl radicals, substituted-alkyl radicals, substituted-cycloalkyl radicals and substituted-aryl radicals, $Y_1$ and $Y_2$ are either the same or different divalent alkyl radicals of 1 to 4 carbon atoms and X is a potential anion, e.g. a halogen atom such as chlorine or bromine bonded directly to an alkyl or aliphatic carbon atom.

It is particularly preferred in preparing the quaternary ammonium polymers to select the particular anion-containing organic compound, e.g. an aromatic dihalide and the aromatic diamine such that the sum of carbon atoms in the repeating unit of the polymer does not exceed the ratio of about 18 carbon atoms for each cationic nitrogen atom and more preferably a ratio of about 8 to 12 carbon atoms for each cationic nitrogen atom in the repeating unit of the polymer. Thus, of the various monomeric ditertiary amines characterized by the above formula, the aromatic containing tertiary diamines are preferred wherein R is a hydrogen or a lower alkyl radical, e.g. methyl radical and $R_1$ and $R_2$ are lower alkyl radicals, i.e. methylene radical and $R_3$, $R_4$, $R_5$, and $R_6$ are lower alkyl radicals of 1 to 4 carbon atoms and more preferably methyl radicals. In addition, either $R_3$, $R_4$, $R_5$ or $R_6$ may be substituted alkyl radicals or combinations thereof. The alkyl and substituted alkyl radicals may be either straight or branched chained, saturated or unsaturated radicals of up to four carbon atoms.

More specifically, of the various diamines the preferred monomeric diamines include the aromatic diamines, such as N,N,N',N'-tetramethyl xylylenediamine, N,N,N',N'-tetraethyl xylylenediamine, N,N,N',N'-tetrapropyl xylylenediamine, N,N,N',N'-tetrabutyl xylylenediamine, N,N,N'N'-tetramethyl metaxylylenediamine, N,N,N',N'-tetrabutyl metaxylylenediamine, N,N,N',N'-tetramethyl paraxylylenediamine, N,N,n',-N'-tetraethyl paraxylylenediamine, N,N,N',N'-tetramethyl butyl-substituted metaxylylenediamine, N,N,N',N'-tetramethyl methyl-substituted paraxylylene diamine, N,N,N',N'-tetramethyl ethyl-substituted metaxylylenediamine, N,N,N',N'-tetraethyl metaxylylenediamine, N,N,N',N'-tetrapropyl metaxylylenediamine, N,N,N',N'-tetrapropyl paraxylylenediamine, N,N,N',N'-tetrabutyl paraxylylenediamine, N,N,N',N'-tetramethyl butyl-substituted paraxylylenediamine, n,N,N',N'-tetramethyl propyl-substituted paraxylylenediamine, N,N,N',N'-tetraethyl butyl-substituted paraxylylenediamine, N,N,N',N'-tetraethyl propyl-substituted paraxylylenediamine, N,N,N',N'-tetrapropyl methyl-substituted paraxylylenediamine, N,N,N',N'-tetrabutyl methyl-substituted paraxylylenediamine or mixtures thereof, etc.

The structure of the polymers may be characterized by repeating units having the general formula:

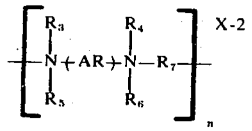

wherein AR is an aromatic or substituted aromatic residue derived from the above-identified diamines, $R_3$, $R_4$, $R_5$ and $R_6$ are the organic radicals identified above, $R_7$ is the residue of the anion-containing compounds, X is preferably a halogen and *n* has a value greater than 5 and preferably greater than 100, e.g. ranging up to 10,000. The ratio of carbon atoms to cationic nitrogen in the formula is no greater than 18 to 1, the cationic nitrogen is connected to the aromatic ring through an aliphatic carbon atom, and the polymer may contain different alkyl and/or aromatic groups coupled in an orderly or random manner. More specific polymers derived from the aromatic diamines and anion-containing compounds may be characterized by the following formulae:

(A)

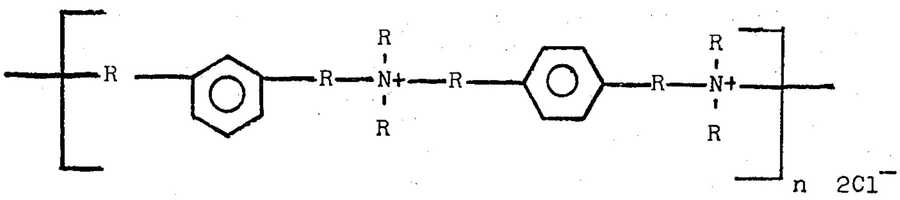

(B)

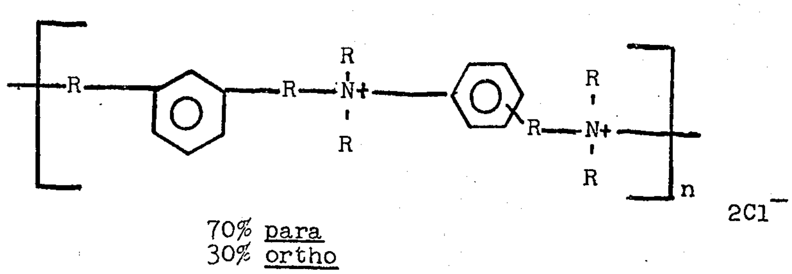

70% para
30% ortho (C)
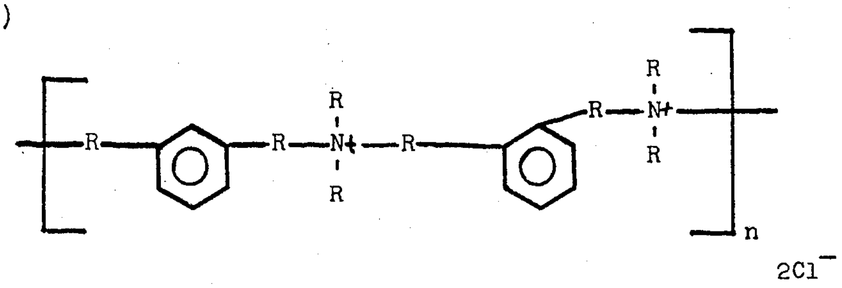
(D)
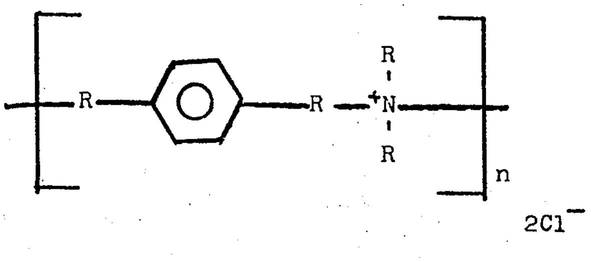
(E)
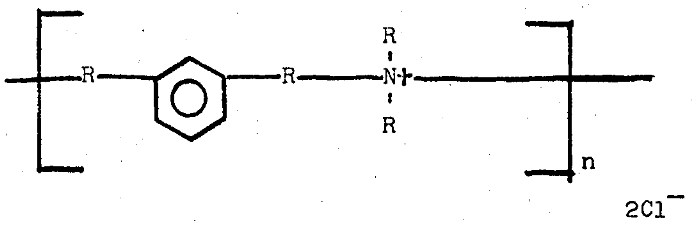
(F)
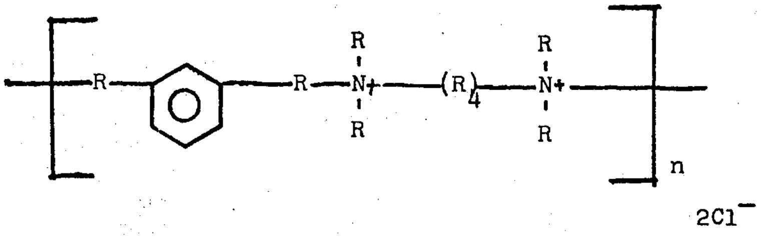

(G)

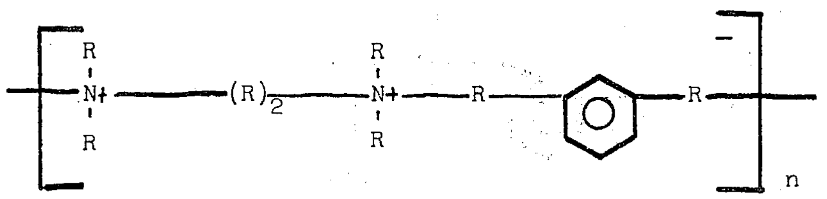

Generally, the anion-containing organic compounds, e.g. preferably the aromatic dihalides may be characterized by the formula:

$X\text{-}Y_1\text{-}R_7\text{-}Y_2\text{-}X$ wherein $R_7$ is a divalent saturated or unsaturated organic radical of up to 16 carbon atoms and preferably from 2 to 8 carbon atoms and is selected from the class consisting of alkyl radicals, e.g. $C_2$–$C_6$, straight or branched alkyl radicals, cycloalkyl radicals, aryl-containing radicals, substituted-alkyl radicals, substituted cycloalkyl radicals and substituted-aryl radicals and $Y_1$ and $Y_2$ are either the same or different divalent alkyl radicals of 1 to 4 carbon atoms, e.g. methylene radicals and X is an anion, e.g. a halogen atom bonded directly to an alkyl carbon atom. These alkyl radical are straight or branched chained, saturated or unsaturated alkyl or substituted-alkyl radicals of up to 4 carbon atoms. More preferably, the anion-containing organic compounds are characterized by the above formula wherein $R_7$ is either a divalent alkyl or aryl containing radicals including, for example, the lower alkyl radicals such as methyl, ethyl, propyl, butyl, pentyl, hexyl, heptyl or octyl or an aryl radical such as a divalent hydrocarbon or substituted-hydrocarbons, e.g. radicals containing phenyl or naphthyl groups and X is a halogen such as chlorine or bromine.

An illustration of the various anion-containing organic compounds that may be used in preparing the quaternary ammonium polymers for purposes of this invention, include the dihaloalkanes having up to 16 carbon atoms such as the substituted-haloalkanes including, for example, 1,2-dichloroethane, 1,4-dibromobutane, 1,3-dichloropropane, 1,10-dichlorodecane, 1,6-dichlorohexane, 1,7-dibromoheptane, 1,12-dibromododecane, 1,2-dibromocyclohexane, 1,2-dichlorocyclohexane, 1,2-dichlorooctane, 1,2-dichlorocyclooctane, 1,2-dibromoethane, 1,2-dibromooctane, etc.

The particularly preferred anion-containing organic compounds may be characterized by the formula:

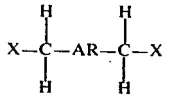

wherein the AR moiety is either a substituted or unsubstituted divalent aromatic radical and X is an anion, e.g. halogen and more specifically characterized by the formula:

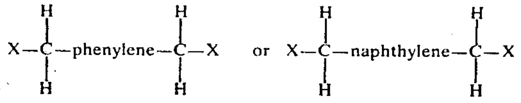

wherein the aromatic moiety is either substituted or unsubstituted in the ring positions available, e.g. with chlorine and X is a halogen structure including one or more of the meta, ortho or paraxylylene- alpha, alpha-prime dihalides, such as dichloro paraxylylene, dichloro metaxylylene, dibromo paraxylylene, dichloro orthoxylylene, tetrachloro paraxylylene, tetrachloro metaxylylene, tetrabromo paraxylylene, etc.

While it is preferred to use anions which are one or more of the recognized salt-forming quaternizing groups, e.g. chlorine or bromine, it is generally understood that other quaternizing groups can be used. These may include, for example, the sulfate, phosphate, acetate, hydroxide and other anions of known ionizable organic acids. Although these other quaternizing agents are useful, they are not as reactive as the halides and, therefore, the latter are preferred for purposes of this invention. Thus, the polymers may be prepared initially with a halide, as the anion, and subsequently exchanged for other anions by various methods including, for example, metathesis or by the use of an anionic exchange resin, etc.

The following Examples illustrate the quaternary ammonium polymers and a method of preparing some for purposes of this invention.

EXAMPLE 1

A quantity of N,N,N',N'-tetramethyl metaxylylenediamine is dissolved in demineralized water (demineralized water is not critical). The amount of water present is sufficient to give a 33% aqueous solution of the polymer at the completion of the polymerization rection. The reaction mixture is heated to temperatures ranging from 50° to 100°C and a stoichiometric amount of xylylene dichloride (30% ortho and 70% paraxylylene dichloride) is slowly added to the solution of diamine. The pH of the reaction mixture is maintained above 7.0 with the addition if necessary of a stoichiometric excess of the tetramethylated diamine. The reaction mixture is slowly heated to reflux temperatures of about 100°C to insure completion of the reaction while maintaining the pH above 7, e.g. at a pH ranging up to about 9.0. The reaction mixture is refluxed for about two hours until the reaction is complete. If hydrolysis of the xylylene dichloride occurs during the polymerization, droplets of oil may be found in the final polymerizate. The droplets of oil can be removed by azeotroping with water in a Dean Stark trap replenishing the removed water with demineralized water. The aqueous solution of quaternary ammonium polymer is then cooled to ambient temperatures and used as an electroconductive coating.

EXAMPLE 2

A quantity of N,N,N',N'-tetramethyl paraxylylene diamine is mixed with water. The amount of water present is sufficient to give about a 33% aqueous solution of the polymer at the completion of the polymerization reaction. The reaction solution is heated to temperatures ranging up to 100°C and a stoichiometric amount of paraxylylene dichloride is slowly added to the solution of diamine. The pH of the reaction mixture is maintained above 7.0 with the addition of a stoichiometric excess of the tetramethylated diamine. The mixture is heated to reflux temperatures of about 100°C to insure completion of the reaction while maintaining the pH above 7.0. The reaction mixture is refluxed for about two hours until the reaction is complete. The aqueous solution of quaternary ammonium polymer is then cooled to ambient temperatures and used as an electroconductive coating.

EXAMPLE 3

A quantity of N,N,N',N'-tetraethyl metaxylylene diamine is mixed with dimineralized water. The amount of water present is sufficient to give about 33% aqueous solution of the polymer at the completion of the polymerization reaction. The reaction solution is heated to temperatures ranging from 50° to 100°C and a stoichiometric amount of paraxylylene dichloride is slowly added to the solution of diamine. The pH of the reaction mixture is maintained above 7.0 with the addition of a stoichiometric excess of the diamine. The reaction mixture is slowly heated to reflux temperatures of about 100°C to insure completion of the reaction while maintaining the pH above 7.0. The reaction mixture is refluxed for about two hours until the reaction is complete. The aqueous solution of the quaternary ammonium polymer is then cooled to ambient temperatures and used as an electroconductive coating.

EXAMPLE 4

A quantity of N,N,N',N'-tetramethyl metaxylylene diamine is mixed with demineralized water. The amount of water present is sufficient to give about a 33% aqueous solution of the polymer at the completion of the polymerization reaction. The reaction solution is heated to temperatures ranging up to 100°C and a stoichiometric amount of metaxylylene dichloride is slowly added to the solution of diamine. The pH of the reaction mixture is maintained above 7.0 with the addition of a stoichiometric excess of the tetramethylated diamine. The reaction mixture is slowly heated to reflux temperatures of about 100°C to insure completion of the reaction while maintaining the pH above 7.0. The reaction mixture is refluxed for about two hours until the reaction is complete. The aqueous solution of quaternary ammonium polymer is then cooled to ambient temperatures and used as an electroconductive coating.

EXAMPLE 5

A quantity of N,N,N',N'-tetrapropyl paraxylylene diamine is mixed with demineralized water. The amount of water present is sufficient to give about a 33% aqueous solution of the polymer at the completion of the polymerization reaction. The reaction solution is heated to temperatures ranging from 50° to 100°C and a stoichiometric amount of molten xylylene dichloride (30% ortho and 70% paraxylylene dichloride) is slowly added to the solution of diamine. The pH of the reaction mixture is maintained above 7.0 with the addition if necessary of a stoichiometric excess of the diamine. The reaction mixture is slowly heated to reflux temperatures of about 100°C to insure completion of the reaction while maintaining the pH above 7.0. The reaction mixture is refluxed for about four hours until the reaction is completed. The aqueous solution of quaternary ammonium polymer is then cooled to ambient temperatures and used as an electroconductive coating. Polymers prepared by the process of Example 1 as characterized hereinabove were tested for electrical resistivities under various humidities as shown in the following Table I.

TABLE I

| Polymers | SURFACE ELECTRICAL RESISTIVITIES SER (ohms/sq. cm.) interpolated to 1 g/m² dpu at shown % RH | | | | | | | | | |
|---|---|---|---|---|---|---|---|---|---|---|
| | 22 | 25 | 27 | 29 | 31 | 34 | 38 | 46 | 49 | 53 | 80 |
| (A) | $4.8\times10^8$ | $7.8\times10^7$ | $1.5\times10^8$ | | | $3.7\times10^7$ | | | | $1.2\times10^7$ | $2.5\times10^6$ |
| (B) | $4.8\times10^8$ | | | $1.9\times10^8$ | $1.5\times10^8$ | | | | $4.8\times10^7$ | | |
| (C) | | | | $2.0\times10^8$ | | $9.0\times10^7$ | | | $4.7\times10^7$ | $2.6\times10^7$ | $4.6\times10^6$ |
| (D) | | | | $2.2\times10^8$ | | | $8.1\times10^7$ | | $4.5\times10^7$ | $1.5\times10^7$ | $3.8\times10^6$ |
| (E) | | $1.2\times10^8$ | | | | $3.7\times10^7$ | $3.1\times10^7$ | $1.1\times10^7$ | | $9.4\times10^6$ | $1.2\times10^7$ |
| (F) | | | | | | $5.6\times10^7$ | | | | $2.5\times10^7$ | $5.4\times10^6$ |

The polymers of this invention are soluble in water and in various organic solvents or mixtures thereof and therefore may be applied to the substrate by brushing, spraying, rolling, doctor blade, wiping or other techniques. The electroconductive polymer may be applied to a paper substrate by thoroughly soaking same with a solution, e.g. an aqueous solution of the polymer on one or both sides or in the alternative may be added to the pulp during the paper making process. The electroconductive layer in terms of dry polymer may vary from about 0.5 to 5.0 and more preferably in amounts ranging from 0.5 to 1.5 grams of polymer per square meter of paper. Apparently, there is no upper limit as to the maximum amount of polymer which may be applied to the paper except to use excessive amounts would be economically unfeasible.

For example, an aqueous solution of the polymer prepared in accordance with Example 1 hereof was coated onto paper to obtain approximately 1.0 gram of polymer per square meter of paper and then dried at temperatures ranging up to about 100°C. A photoconductive dispersion consisting essentially of zinc oxide was coated onto the previously coated paper substrate and again dried at temperatures ranging at up to 100°C. The top coating of the photoconductive material, i.e. zinc oxide dissolved or dispersed in a solvent, such as an aqueous medium does not cause any appreciable leaching of the electroconductive polymer from the paper. In addition to the electroconductive polymer, the coating applied to the substrate may include other known additives including, for example, stabilizing agents, resins, plasticizers, dispersing agents, pigments or binders such as styrene-butadiene resins, starch, etc.

While this invention has been described by a number of specific examples, it is obvious that other modifications can be made without departing from the scope of the invention as set forth in the appended claims.

What is claimed is:

1. Electroconductive paper having a resistivity of less than about $10^{11}$ ohm/sq. cm. at relative humidities of about 10% to 90% which comprises paper and an effective amount of a substantially water-soluble electroconductive quaternary ammonium polymer to render the paper electroconductive; said polymer obtained by reacting a. approximately 0.8 to 1.3 moles of at least one aromatic ditertiary amine having the formula:

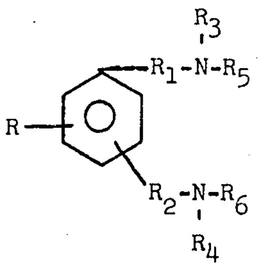

wherein R is hydrogen, an alkyl or substituted alkyl radical of 1 to 4 carbon atoms, $R_1$ and $R_2$ are the same or different divalent alkyl or substituted-alkyl radicals of 1 lto 4 carbon atoms and $R_3$, $R_4$, $R_5$ and $R_6$ are the same or different radicals selected from the group consisting of alkyl and substituted-alkyl radicals of 1 to 4 carbon atoms, and b. about 1.0 mole of at least one anion-containing organic compound having the formula:

$$X\text{-}Y_1\text{-}R_7\text{-}Y_2\text{-}X$$

wherein $R_7$ is a divalent organic radical having up to 16 carbon atoms selected from the group consisting of alkyl radicals, cycloalkyl radicals, aryl radicals, substituted-alkyl radicals, substituted-cycloalkyl radicals and substituted-aryl radicals, $Y_1$ and $Y_2$ are either the same or different divalent alkyl radicals of 1 to 4 carbon atoms and X is an anion bonded directly to an alkyl carbon atom.

2. The electroconductive paper of claim 1 further characterized in that $R_1$ and $R_2$ are saturated or unsaturated, straight or branch-alkyl radicals.

3. The electroconductive paper of claim 1 further characterized in that $R_3$, $R_4$, $R_5$, and $R_6$ are saturated or unsaturated, straight or branch-alkyl radicals.

4. The electroconductive paper of claim 1 further characterized in that R is an alkyl radical.

5. The electroconductive paper of claim 1 further characterized in that $R_7$ is a saturated or unsaturated, branched or straight-chain alkyl radical.

6. Electroconductive paper of claim 1 further characterized in that $R_1$ and $R_2$ are methylene radicals.

7. The electroconductive paper of claim 1 further characterized in that $Y_1$ and $Y_2$ are saturated or unsaturated alkyl radicals.

8. The electroconductive paper of claim 1 further characterized in that $R_3$, $R_4$, $R_5$ and $R_6$ are methyl radicals.

9. The electroconductive paper of claim 1 further claim 1 further characterized in that X is chlorine or bromine.

10. The electroconductive paper of claim 9 further characterized in that $R_7$ is an aryl radical.

11. The electroconductive paper of claim 9 further characterized in that the aryl radical is a phenylene radical.

12. A process for preparing electroconductive paper having a resistivity of less than $10^{11}$ ohms/sq. cm. at relative humidities of about 10% to 90% which comprises applying to paper an effective amount of a water-soluble electroconductive quaternary ammonium polymer to render the paper electroconductive; said polymer obtained by reacting a. approximately 0.8 to 1.3 moles of at least one aromatic ditertiary amine having the formula:

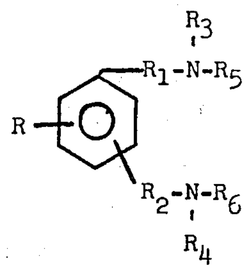

wherein R is hydrogen, an alkyl or substituted-alkyl radical of 1 to 4 carbon atoms, $R_1$ and $R_2$ are the same or different divalent alkyl or substituted-alkyl radicals of 1 to 4 carbon atoms and $R_3$, $R_4$, $R_5$ and $R_6$ are the same or different radicals selected from the group consisting of alkyl and substituted-alkyl radicals of 1 to 4 carbon atoms and b. about 1.0 mole of at least one anion-containing organic compound having the formula:

$$X\text{-}Y_1\text{-}R_7\text{-}Y_2\text{-}X$$

wherein $R_7$ is a divalent organic radical having up to 16 carbon atoms selected from the group consisting of alkyl radicals, cycloalkyl radicals, aryl radicals, substituted-alkyl radicals, substituted-cycloalkyl radicals and substituted-aryl radicals, $Y_1$ and $Y_2$ are either the same or different divalent alkyl radicals of 1 to 4 carbon atoms and X is an anion bonded directly to an alkyl carbon atom.

13. The process of claim 12 further characterized in that $R_1$ and $R_2$ are methylene radicals and $R_3$, $R_4$, $R_5$ and $R_6$ are alkyl radicals of 1 to 4 carbon atoms.

14. The process of claim 12 further characterized in that $R_7$ is a divalent aryl radical, $Y_1$ and $Y_2$ are saturated or unsaturated alkyl radicals of 1 to 4 carbon atoms and X is chlorine.

15. The process of claim 12 further characterized in that the aromatic ditertiary amine is xylylene tertiary diamine and the anion-containing compound is a xylylene dichloride.

16. The process of claim 12 further characterized in that the anion-containing compound is an ortho, meta or paraxylylene dichloride or a combination thereof.

17. The process of claim 12 further characterized in that the anion-containing compound is 1,4-dichloro butane.

18. The process of claim 12 further characterized in that the electroconductive polymer is coated onto the paper in an amount ranging from about 0.5 to 1.5 grams of said electroconductive polymer per sq. meter of paper.

19. The process of claim 18 further characterized in that the electroconductive polymer is coated onto the paper in the form of an aqueous solution.

* * * * *